Patented Mar. 16, 1948

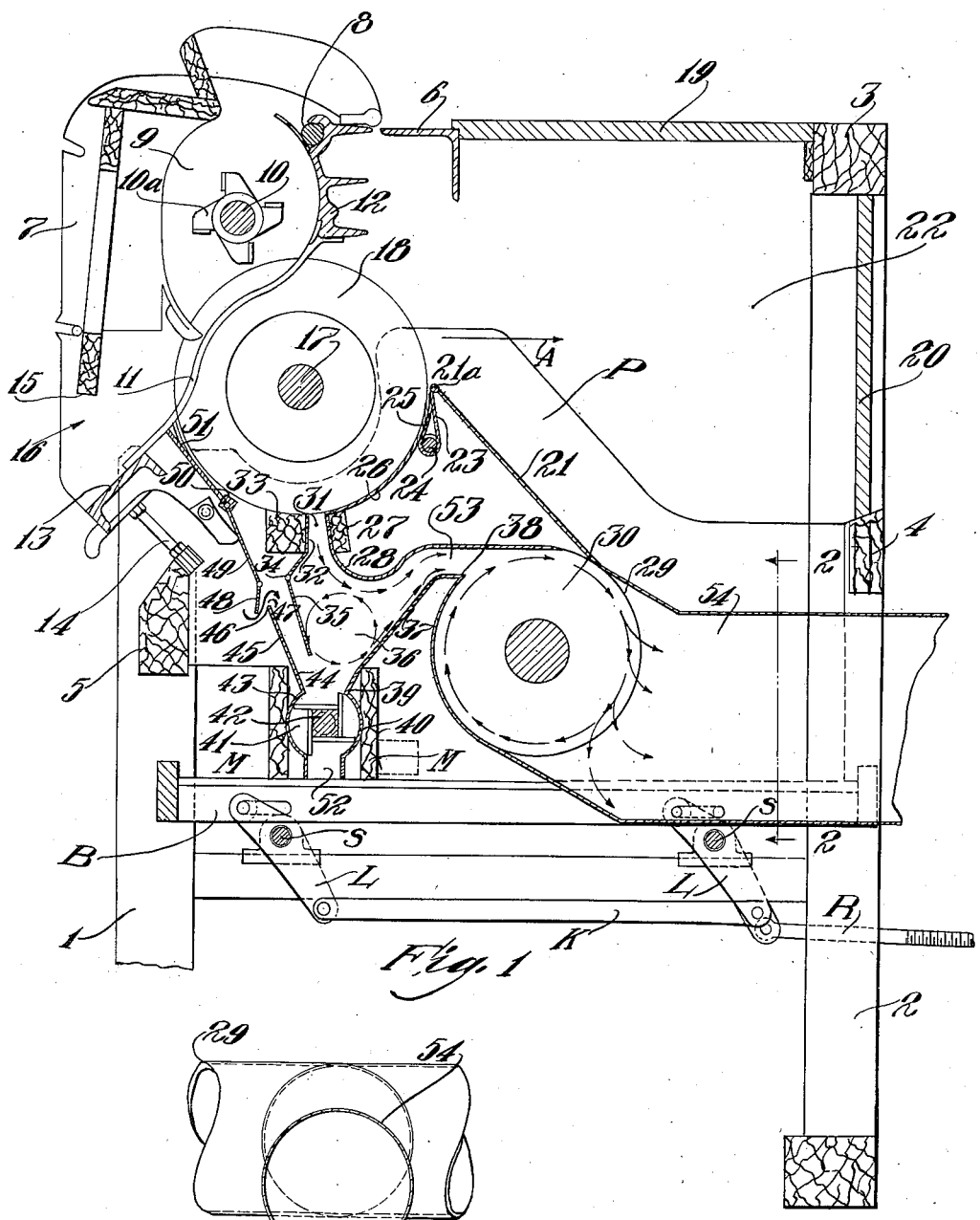

2,438,047

UNITED STATES PATENT OFFICE 2,438,047

LINTER GIN

Herman C. Graebe, Bridgewater, Mass., assignor to The Murray Company, Dallas, Tex., a corporation of Texas Application June 17, 1946, Serial No. 677,261

9 Claims. (Cl. 19—58)

This invention pertains to linter gins, more especially to linter gins of the so-called brushless type, and particularly to improvements in a pneumatic double moting linter, the means for separating the lint from the saw cylinder and for separating motes or other impurities from the useful fiber.

Brushless linters have certain advantages over linters in which the lint is removed from the saw cylinder by brush action, among these advantages being the lower cost of operation and the avoidance of the difficulties incident to the adjustment of the brush relatively to the saw cylinder, and the cost and trouble of obtaining and maintaining the brush in good condition. However, brushless linters have not always proven successful, particularly in respect to their effectiveness in separating the useful fibers from the motes and other impurities. One object of the present invention is to provide a brushless linter so designed as effectively to remove the lint from the saw cylinder and to separate the useful fiber from impurities. A further object is to provide a brushless linter so designed that the removal of the lint from the saw cylinder is effectively accomplished by suction action and without recourse to the use of air blast nozzles or similar high pressure pneumatic devices. A further object is to provide a brushless linter having provision for overhead or centrifugal moting, and also for gravity moting beneath the saw cylinder. A further object is to provide a linter of this type so designed that the gravity moting action may be accurately adjusted so as to avoid loss of useful fiber while at the same time effectively separating impurities. A further object is to provide a brushless linter so devised as effectively to prevent useful fiber from traveling with the saw blades back into the roll-box and into the slots of the grate-fall. Other and further objects and advantages of the invention will be pointed out in the following more detailed description and by reference to the accompanying drawings wherein Fig. 1 is a fragmentary diagrammatic front-to-rear section through a linter gin embodying the present invention; and Fig. 2 is a fragmentary vertical section, substantially on the line 2—2 of Fig. 1, illustrating the arrangement of the lint-collecting drum and the delivery conduit.

Referring to the drawings, the numerals 1 and 2 designate upright members of the frame of the apparatus, while the numerals 3, 4, 5 and 6 designate horizontal transverse members, it being understood that the frame may be constructed in any desired manner and in accordance with conventional design, thereby to support the various operative instrumentalities. The frame of the apparatus also comprises end plates 7, of which only one is illustrated, which carry the bearings for the various operative instrumentalities, all in accordance with usual practice. A shaft 8 at the upper forward portion of the frame supports the breast structure, comprising the roll-box 9, in which turns the shaft 10 upon which is mounted the float roll 10ª. The breast structure also comprises the grate-bars 11, secured at their upper ends to the transverse member 12 of the roll-box and at their lower ends to the seed-board 13, the breast structure being adjustable toward and from the saw cylinder by means of the adjustable support 14. The breast-board terminates at the point 15 and between this point and the seed-board 13 there is provided a space 16 for the escape of the seeds and which also provides an air inlet. The saw shaft 17 is arranged to the rear of the grate-bars 11 and supports the saw cylinder 18.

The space to the rear and above the saw cylinder is bounded by the panels 19 and 20, and the floor 21, thus defining the note-receiving chamber 22. In the lower part of the frame of the apparatus there is arranged a vertically movable supporting structure indicated at B, mounted upon the upper ends of levers L carried by the parallel shafts S and connected at their lower ends by the link K, and which may be adjusted by means of the adjusting rod R so as to raise or lower the supporting structure B. At its opposite ends this supporting structure carries plates P (one only being shown) which are located just inside the respective end walls 7 of the gin, these plates being united at their lower forward portions by parallel rails M. The supporting structure, including the plates P, constitutes a support for the moting mechanism which may thus be moved up and down with respect to the saw shaft to compensate for variations in diameter of the saw cylinder.

The floor of the upper moting space 22 is defined by a sheet metal web 21 secured at its opposite ends to the plates P and which extends upwardly and forwardly, terminating at a point 21ª closely adjacent to the periphery of the saw cylinder, and as here illustrated substantially in the horizontal plane of the axis of the cylinder. This upper forward end 21ª of this web or panel 21 is secured to the upper end of a bracket member 23 mounted on a transverse shaft 24. By turning this shaft the end 21ª of the web 21 may be moved in or out relatively to the periphery of the saw cylinder. The bracket 23 also comprises a forward concave member 25 substantially concentric with the saw cylinder, and which extends downwardly from the point 21ª to the shaft 24. From the shaft 24 a continuation 26 of this concave member 25 extends downwardly and concentric with the saw cylinder, and is supported at its forward lower end by a transverse bar 27 attached at its opposite ends to the plates P. The member 26 extends downwardly along the forward face of the supporting member 27 and then curves downwardly, upwardly and rearwardly and merges with the upper part of the cylindrical wall of a lint-collecting cylinder 29 whose axis is horizontal and which extends transversely from one of the plates P to the other, being closed at its opposite ends by these plates. This cylinder 29 defines the lint-collecting chamber 30 which receives the lint from the gravity moting chamber from which the airborne lint is delivered as hereafter described.

That portion of the concave guard member 26 which extends downwardly along the forward face of the support 27 defines the rear wall of a downwardly directed lint-delivery throat 31 whose forward wall is defined by a sheet metal member 32 extending downwardly from adjacent to the periphery of the saw cylinder, and which is supported by a transverse rail 33 mounted at its opposite ends on the plates P. The member 32 extends downwardly and then forwardly, terminating at the point 34, where it is provided with a hinge to which the upper end of a deflector 35 is connected. Suitable provision may be made for swinging the lower end of this deflector 35 from front to rear, and for holding it in adjusted position, thereby to vary the dimensions of the gravity moting chamber 36 into which the lint is delivered from the saw cylinder through the throat 31. The rear wall of this gravity moting chamber 36 is defined by a downwardly and forwardly sloping wall 37 which is secured at its upper edge 38 to the forward portion of the wall of the lint-collecting cylinder 29, and which is connected at its lower edge, at 39, to the rear wall 40 of a cylindrical valve casing defining a chamber 41 in which is located the rotary mote delivery valve 42. The forward wall of this valve chamber 41 is defined by a curved panel 43 from whose upper edge 44 a panel 45 extends upwardly and forwardly, terminating at 46 to define the lower edge of an air inlet port 47 whose effective size is controlled by a swinging valve 48 hinged to the lower end of a panel 49 supported by a transverse rail 50 and whose upper part is substantially concentric with the saw cylinder. The upper part of this panel overlaps a concave fixed panel 51 carried by the grate-fall. The casing of the mote valve chamber 41 is disposed between the rails M, and the members 37 and 45 are in part supported by these rails M. The valve 42 is rotated slowly during the operation of the machine, so as to deliver motes collected above it into the discharge passage 52, but without permitting substantial amounts of air to enter the lower part of the moting chamber 36. The parts 45, 48, 49 and 51 collectively constitute guard means operative to insure the in-draft of air through the spaces between the grate bars and in opposition to the direction in which the saws turn.

The members 28 and 37 define a lint delivery passage 53 which leads from the upper part of the gravity moting chamber 36 and opens tangentially into the lint-collecting chamber 30. From the central part of this lint-collecting chamber 30, a conduit 54 (Fig. 2) extends rearwardly and substantially horizontally and is connected to a source of low pressure, for example to a suction fan, flue system, or the intake of a condenser or the like.

In the operation of the apparatus, subatmospheric pressure is established in the conduit 54, thus tending to draw air out of the collecting chamber 30 and through the passage 53 and from the throat opening 31. A small amount of air drawn between the grate bars by the suction in conduit 54 may be permitted to enter through the inlet port 47, but the amount of such air may be regulated manually by adjustment of valve 48 so as to adjust the moting operation. Most of the air which enters the lint-collecting chamber 30 must enter the throat 31 and must approach the throat by traveling peripherally of the saw cylinder and between the cylinder and the concave member 26.

The rotation of the saw cylinder tends to throw heavy motes or other impurities away from the periphery of the saw, in the general direction of the arrows A, into the upper mote-collecting chamber 21 from which they may be removed in any suitable way, for example, by a transversely arranged screw conveyor (not shown) or from which they may drop through appropriate passages into a receptacle arranged beneath the linter. The useful fiber and the finer motes are carried along with the saw blades down past the point 21ª and between the saw cylinder and the concave member 26, and are removed from the cylinder by the suction action at the throat opening 31, and are thus delivered into the moting chamber 36. As the air enters this chamber, its velocity suddenly drops, by reason of the shape and dimensions of the chamber, and rotary air currents are set up, the velocity and position of which may be varied by moving the deflector 35 and the valve 48. By observation and test these parts may be so adjusted that the moting in the chamber 36 will be very effective to drop out the finer motes and other impurities into the upper part of valve chamber 41, while the useful fiber travels along with the air current which flows out through the passage 53 and into the collecting chamber 30. In this chamber the air moves peripherally and then inwardly toward the center of the chamber, and escapes through the conduit 54, carrying with it the useful lint.

In the construction shown, the air pressure in the space rearwardly of the panel 49 and between the latter and the panel 32 is not substantially different from that in the throat 31. Thus any lint which may continue past the throat opening 31 tends to be removed and to drop into the space between the parts 33 and 49 before it can be delivered to the grate-fall, and any such lint as drops into the space between the parts 33 and 49 is swept downwardly between the air current entering at the port 47, and is thus delivered into the moting space 36. Preferably the gin casing is substantially air-tight and the suction maintained within the gin casing is sufficient to avoid any possibility of outflow of air therefrom, except through conduit 54, and to maintain at least a slight inflow of air through inlet 16 and rearwardly along the periphery of the saw cylinder toward the throat 31. Since no air can enter the moting space except through the throat 31 and the port 47, it is possible to maintain exact conditions in the moting space 36 such as to insure a highly effective separation of the lint and impurities.

The arrangement thus provides for the overhead moting of heavy impurities, and the gravity moting of the finer impurities, in a highly effective and accurately regulated manner, so that there is very little loss of useful fiber and a very effective removal of all impurities.

While one desirable embodiment of the invention has been illustrated by way of example, it is to be understood that the invention is broadly inclusive of any and all modifications falling within the scope of the appended claims.

I claim:

1. A brushless linter gin of the kind wherein the lint is removed from the saw cylinder by suction means and which has a roll-box, a grate-fall, a saw cylinder, means, including a floor, defining an overhead moting space above and to the rear of the saw cylinder, means defining a gravity moting chamber below the saw cylinder, means providing a lint delivery throat extending from adjacent to the periphery of the saw cylinder to the gravity moting chamber, said lint delivery throat being narrow from front to rear as compared with the gravity moting chamber and being defined by substantially parallel and vertical front and rear walls and a lint delivery conduit in which subatmospheric pressure is maintained, the gravity moting chamber having a rearwardly directed outlet providing communication between it and the conduit, the gin being characterized in having an imperforate curved shield extending downwardly and in close adjacency to the periphery of the saw cylinder from the forward edge of the floor of the overhead moting space to the rear edge of the lint delivery throat.

2. A linter gin of the kind wherein the lint is removed from the saw cylinder by suction, and which has a roll-box, a grate-fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, said lint delivery throat being narrow from front to rear as compared with the gravity moting chamber and being defined by substantially parallel and vertical front and rear walls and a curved shield substantially concentric with the periphery of the saw cylinder extending from the forward edge of the floor of the overhead moting space to the rear edge of said lint delivery throat, the gin being characterized in having guard means interposed between the grate-fall and the forward edge of said lint delivery throat operative to insure a flow of air in a direction opposite to the movement of the saw cylinder from adjacent to the grate-fall toward said lint delivery throat, said guard means being provided with a regulable port for admitting air to the gravity moting chamber.

3. A linter gin of the kind wherein the lint is removed from the saw cylinder by pneumatic means, and which has a roll box, a grate-fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, said lint delivery throat being narrow from front to rear as compared with the gravity moting chamber and being defined by substantially parallel and vertical front and rear walls and a curved shield substantially concentric with the periphery of the saw cylinder extending from the forward edge of the floor of the overhead moting space to the rear edge of said lint delivery throat, the gin being characterized in that the forward wall of said lint delivery throat extends downwardly to define the forward wall of the gravity moting chamber, and means defining a delivery passage for airborne lint which extends rearwardly from said gravity moting chamber and communicates with the lint delivery conduit, the rear wall of said lint delivery throat merging with the upper wall of said delivery passage.

4. A linter gin of the kind wherein the lint is removed from the saw cylinder by suction, and which has a roll-box, a grate-fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, said lint delivery throat being narrow from front to rear as compared with the gravity moting chamber and being defined by substantially parallel and vertical front and rear walls and a curved shield substantially concentric with the periphery of the saw cylinder extending from the forward edge of the floor of the overhead moting space to the rear wall of said lint delivery throat, the gin being characterized in that the forward wall of said lint delivery throat extends downwardly to define the forward wall of the gravity moting chamber, and guard means extending downwardly from the grate-fall to a point adjacent to but spaced forwardly from the forward wall of the gravity moting chamber, said guard means and the forward wall of the throat defining between them an air-admission passage leading to the lower part of the gravity moting chamber.

5. A linter gin of the kind wherein the lint is removed from the saw cylinder by suction, and which has a roll-box, a grate-fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, and a curved shield substantially concentric with the periphery of the saw cylinder extending from the forward edge of the floor of the overhead moting space to the rear edge of said lint delivery throat, the gin being characterized in having guard means which extends downwardly from the grate-fall to a point adjacent to but spaced forwardly from the lower edge of the forward wall of the gravity moting chamber, said guard means and said forward wall of the moting chamber defining an air-admission passage leading from the space between the bars of the grate-fall to the lower part of the gravity moting chamber, and means defining a regulable air port for admitting air to said passage.

6. A linter gin of the kind wherein the lint is removed from the saw cylinder by pneumatic means, and which has a roll-box, a grate-fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, said lint delivery throat being narrow from front to rear as compared with the gravity moting chamber and being defined by substantially parallel and vertical front and rear walls and a curved shield substantially concentric with the periphery of the saw cylinder extending from the forward edge of the floor of the overhead moting space to the rear edge of said lint delivery throat, the gin being characterized in having guard means which extends downwardly from the grate-fall to a point adjacent to but spaced forwardly from the lower edge of the forward wall of the gravity moting chamber, said guard means and said forward wall of the moting chamber defining an admission passage leading from the spaces between the bars of the grate-fall to the lower part of the gravity moting chamber, the lower part of the forward wall of the gravity moting chamber being adjustable from front to rear thereby to vary the capacity of said chamber.

7. A linter gin of the kind wherein the lint is removed from the saw cylinder by pneumatic means, and which has a roll-box, a grate fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, said lint delivery throat being narrow from front to rear as compared with the gravity moting chamber and being defined by substantially parallel and vertical front and rear walls and a curved shield substantially concentric with the periphery of the saw cylinder extending from the floor of the overhead moting space to the rear edge of said lint delivery throat, the gin being characterized in having guard means extending downwardly and rearwardly from the grate-fall to a point adjacent to the lower part of the gravity moting chamber, said guard means being constructed and arranged to insure the inward flow of air through the spaces between the grate-bars toward the lint delivery throat and in opposition to the direction in which the saws turn and comprising an adjustable valve for varying said air flow.

8. A brushless linter gin of the kind wherein the lint is removed from the saw cylinder by suction, and which has a roll-box, a grate-fall, a saw cylinder, means, including a floor, defining an overhead moting space to the rear of the saw cylinder for the reception of motes centrifugally expelled by the saw cylinder, a lint delivery conduit wherein subatmospheric pressure is maintained, means defining a gravity moting chamber beneath the saw cylinder, means defining a lint delivery throat extending downwardly from adjacent to the periphery of the saw cylinder to the gravity moting chamber, said lint delivery throat being narrow from front to rear as compared with the gravity moting chamber and being defined by substantially parallel and vertical front and rear walls and a curved guard substantially concentric with the periphery of the saw cylinder extending from the floor of the overhead moting space to the rear edge of said lint delivery throat, and wherein the gravity moting chamber has a bottom delivery opening for motes, the gin being characterized in having means operative to deliver air from the space between the bars of the grate-fall into said mote delivery opening.

9. A brushless linter gin of the kind having a roll-box, a grate-fall, a saw cylinder, means, including a floor member whose forward edge is adjacent to the periphery of the saw cylinder, which defines an overhead moting space at the rear of the saw cylinder, and a lint delivery conduit in which subatmospheric pressure is maintained, the gin being characterized in having means defining a gravity moting chamber below the saw cylinder, and means defining a lint delivery throat leading downwardly from adjacent to the periphery of the saw cylinder into the upper part of said moting chamber, said lint delivery throat being narrow from front to rear as compared with the gravity moting chamber and being defined by substantially parallel and vertical front and rear walls the gravity moting chamber having a discharge opening for motes at its lower part, and means defining a delivery passage for airborne lint leading rearwardly from the upper part of the gravity moting chamber to the lint delivery conduit, the gravity moting chamber being of such shape and dimensions that the air entering the chamber through the throat is reduced to a mote dropping velocity, a mote valve closing the lower part of the gravity moting chamber and means admitting a regulable amount of air to the lower part of the gravity chamber at a point above said valve.

HERMAN C. GRAEBE.

REFERENCES CITED

The following references are of record in the file of this patent:

UNITED STATES PATENTS

| Number | Name | Date |
|---|---|---|
| 1,086,204 | Murray | Feb. 3, 1914 |
| 1,576,111 | Garner | Mar. 9, 1926 |
| 2,129,312 | Streun | Sept. 6, 1938 |
| 2,310,598 | Ricker | Feb. 9, 1943 |
| 2,372,796 | Rogers et al. | Apr. 3, 1945 |